United States Patent
Gunda et al.

(10) Patent No.: US 12,499,001 B2
(45) Date of Patent: Dec. 16, 2025

(54) EFFICIENT PERFORMANCE OF ERROR RATE DETECTION PROCEDURES IN A MEMORY SYSTEM

(71) Applicant: Micron Technology, Inc., Boise, ID (US)

(72) Inventors: Sridhar Prudviraj Gunda, Karnataka (IN); Thibash Rajamani Balakrishnan, Karnataka (IN); Saurav Pundir, Karnataka (IN); Sunil Singh Dhanik, Karnataka (IN)

(73) Assignee: Micron Technology, Inc., Boise, ID (US)

( * ) Notice: Subject to any disclaimer, the term of this patent is extended or adjusted under 35 U.S.C. 154(b) by 10 days.

(21) Appl. No.: 18/581,267

(22) Filed: Feb. 19, 2024

(65) Prior Publication Data

US 2024/0282396 A1    Aug. 22, 2024

Related U.S. Application Data

(60) Provisional application No. 63/486,384, filed on Feb. 22, 2023.

(51) Int. Cl.
  *G06F 11/07* (2006.01)
  *G11C 29/44* (2006.01)

(52) U.S. Cl.
  CPC .......... *G06F 11/0754* (2013.01); *G11C 29/44* (2013.01)

(58) Field of Classification Search
  CPC . G11C 29/44; G11C 29/42; G11C 2029/0409; G11C 2029/0411; G06F 11/0754
  See application file for complete search history.

(56) References Cited

U.S. PATENT DOCUMENTS

| | | | | |
|---|---|---|---|---|
| 7,996,642 B1* | 8/2011 | Smith | ................ | G06F 12/0246 711/167 |
| 9,632,870 B2* | 4/2017 | Bennett | ................ | G06F 3/0689 |
| 2005/0102419 A1* | 5/2005 | Popescu | ................ | H04L 43/00 709/238 |
| 2006/0184720 A1* | 8/2006 | Sinclair | ............... | G06F 12/0246 711/E12.008 |
| 2008/0244339 A1* | 10/2008 | Kong | ................ | G11C 11/5628 714/704 |
| 2008/0294814 A1* | 11/2008 | Gorobets | ............. | G11C 16/349 710/62 |
| 2011/0119455 A1* | 5/2011 | Tsai | ...................... | G06F 3/0608 711/E12.001 |
| 2015/0363120 A1* | 12/2015 | Chen | .................. | G06F 12/0246 711/103 |
| 2015/0378801 A1* | 12/2015 | Navon | ................ | G06F 11/076 714/704 |
| 2021/0294737 A1* | 9/2021 | Wang | .................. | G06F 12/0822 |

\* cited by examiner

*Primary Examiner* — Steve N Nguyen
(74) *Attorney, Agent, or Firm* — Holland & Hart LLP (57) ABSTRACT

Methods, systems, and devices for efficient performance of error rate detection procedures in a memory system are described. A memory system may determine whether a condition for performing an error rate detection procedure has been satisfied. Based on determining that the condition has been satisfied, the memory system may add a request for the error rate detection procedure to a queue. The memory system may then perform the error rate detection procedure indicated by the request in the queue based on determining that access activity from a host system has lapsed for a threshold duration.

20 Claims, 5 Drawing Sheets

EFFICIENT PERFORMANCE OF ERROR RATE DETECTION PROCEDURES IN A MEMORY SYSTEM

CROSS REFERENCE

The present Application for Patent claims priority to U.S. Patent Application No. 63/486,384 by Gunda et al., entitled "EFFICIENT PERFORMANCE OF ERROR RATE DETECTION PROCEDURES IN A MEMORY SYSTEM," filed Feb. 22, 2023, which is assigned to the assignee hereof, and which is expressly incorporated by reference in its entirety herein.

TECHNICAL FIELD

The following relates to one or more systems for memory, including efficient performance of error rate detection procedures in a memory system.

BACKGROUND

Memory devices are widely used to store information in devices such as computers, user devices, wireless communication devices, cameras, digital displays, and others. Information is stored by programming memory cells within a memory device to various states. For example, binary memory cells may be programmed to one of two supported states, often denoted by a logic 1 or a logic 0. In some examples, a single memory cell may support more than two states, any one of which may be stored. To access the stored information, the memory device may read (e.g., sense, detect, retrieve, determine) states from the memory cells. To store information, the memory device may write (e.g., program, set, assign) states to the memory cells.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), self-selecting memory, chalcogenide memory technologies, not-or (NOR) and not-and (NAND) memory devices, and others. Memory cells may be described in terms of volatile configurations or non-volatile configurations. Memory cells configured in a non-volatile configuration may maintain stored logic states for extended periods of time even in the absence of an external power source. Memory cells configured in a volatile configuration may lose stored states if disconnected from an external power source.

DETAILED DESCRIPTION

In some systems, a memory system may perform error rate detection procedures to determine the error rate for different sets of memory cells. The error rate detection procedures may allow the memory system to determine sets of cells that have unreliable content due to, for example, disturbances that occur if neighboring cells are subjected to many read operations. A memory system may intermittently perform error rate detection procedures upon satisfaction of (e.g., occurrence of) one or more triggering conditions. For example, a memory system may perform an error rate detection procedure if a quantity of read commands received from a host system satisfies a threshold quantity. But performing an error rate detection procedure upon satisfaction of the triggering condition may result in the memory system performing the error rate detection procedure in the foreground (e.g., during an active time in which the memory system is servicing memory access commands from the host system), which may increase the latency of serving the memory access commands due to some prioritizing of the error rate detection procedure.

According to the techniques described herein, a memory system may improve performance by performing at least some error rate detection procedures in the background (e.g., during an idle time in which the memory system is not servicing memory access commands from the host system) based on one or more criteria. For example, upon satisfaction of a triggering condition for performing an error rate detection procedure, the memory system may add a request for the error rate detection procedure to a request queue (rather than, for example, immediately performing the error rate detection procedure in the foreground). The memory system may then wait for an idle time before performing the error rate detection procedure essentially temporarily delaying performing the error rate detection procedure. Thus, the memory system may perform at least some error rate detection procedures in the background (e.g. during an idle time), which may help the memory system reduce the latency of serving access commands from a host system in the foreground (e.g. during an active time), among other benefits.

In addition to applicability in memory systems as described herein, techniques for improved efficient performance of error rate detection procedures in a memory system may be generally implemented to improve the performance of various electronic devices and systems (including artificial intelligence (AI) applications, augmented reality (AR) applications, virtual reality (VR) applications, and gaming). Some electronic device applications, including high-performance applications such as AI, AR, VR, and gaming, may be associated with relatively high processing requirements to satisfy user expectations. As such, increasing processing capabilities of the electronic devices by decreasing response times, improving power consumption, reducing complexity, increasing data throughput or access speeds, decreasing communication times, or increasing memory capacity or density, among other performance indicators, may improve user experience or appeal. Implementing the techniques described herein may improve the performance of electronic devices by facilitating efficient performance of error rate detection procedures in a memory system, which may decrease processing or latency times, improve response times, or otherwise improve user experience, among other benefits.

Figure 1:
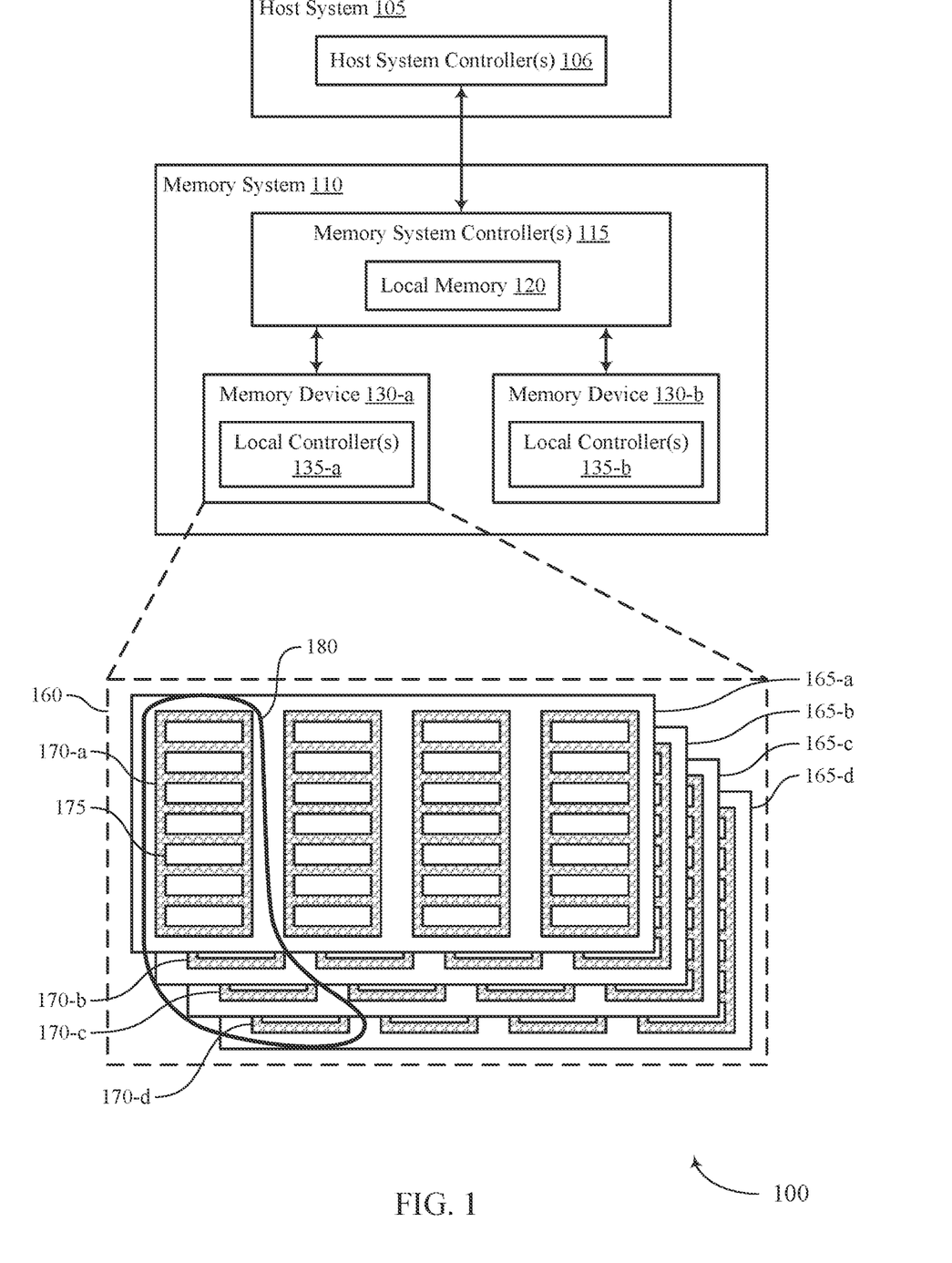
FIG. 1 illustrates an example of a system that supports efficient performance of error rate detection procedures in accordance with examples as disclosed herein.
Figure 2:
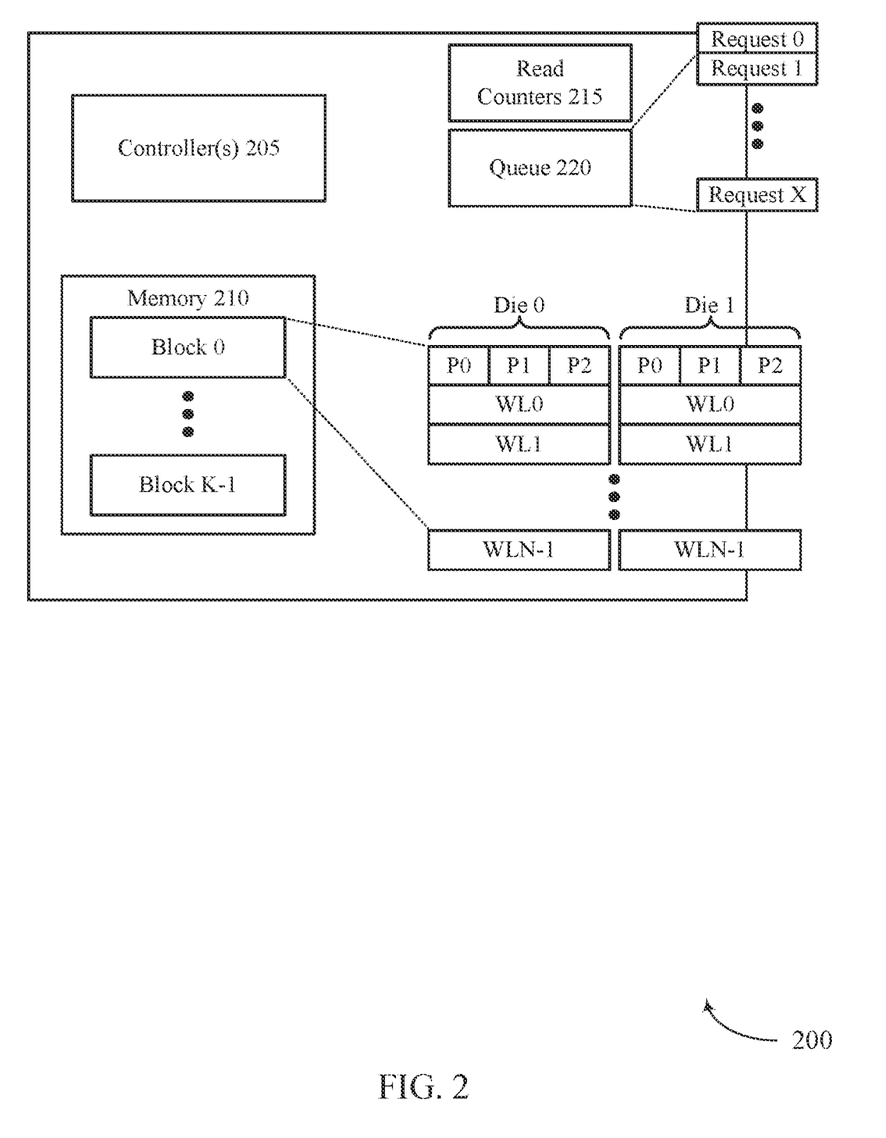
FIG. 2 illustrates an example of a system that supports efficient performance of error rate detection procedures in accordance with examples as disclosed herein.

Features of the disclosure are initially described in the context of systems, devices, and circuits with reference to FIGS. 1 through 2. Features of the disclosure are described in the context of a process flow with reference to FIG. 3. These and other features of the disclosure are further illustrated by and described in the context of an apparatus diagram and flowchart that relate to efficient performance of error rate detection procedures in a memory system with reference to FIGS. 4 through 5.

FIG. 1 illustrates an example of a system 100 that supports efficient performance of error rate detection procedures in a memory system in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IOT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with one or more host system controllers 106, which may be an example of a controller or control component configured to cause the host system 105 to perform various operations in accordance with examples as described herein. The host system 105 may include one or more devices and, in some cases, may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may, in some cases, be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between one or more host system controllers 106 of the host system 105 and one or more memory system controllers 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include one or more memory system controllers 115 and one or more memory devices 130. A memory device 130 may include one or more memory arrays of any type of memory cells (e.g., non-volatile memory cells, volatile memory cells, or any combination thereof). Although two memory devices 130-a and 130-b are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hardcoded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally, or alternatively, include static random access memory (SRAM) or other memory that may be used by the memory system controller 115 for internal storage or calculations, for example, related to the functions ascribed herein to the memory system controller 115. Additionally, or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally, or alternatively, rely on an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may, in some cases, be performed instead by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EE-PROM), or any combination thereof. Additionally, or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a die 160 (e.g., a memory die). For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally, or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may be performed on different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-a, 170-b, 170-c, and 170-d that are within planes 165-a, 165-b, 165-c, and 165-d, respectively, and blocks 170-a, 170-b, 170-c, and 170-d may be collectively referred to as a virtual block 180. In some cases, a virtual block may include blocks 170 from different memory devices 130 (e.g., including blocks in one or more planes of memory device 130-a and memory device 130-b). In some cases, the blocks 170 within a virtual block may have the same block address within their respective planes 165 (e.g., block 170-a may be "block 0" of plane 165-a, block 170-b may be "block 0" of plane 165-b, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programmed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may, in some cases, not be updated until the entire block 170 that includes the page 175 has been erased.

In some cases, to update some data within a block 170 while retaining other data within the block 170, the memory device 130 may copy the data to be retained to a new block 170 and write the updated data to one or more remaining pages of the new block 170. The memory device 130 (e.g., the local controller 135) or the memory system controller 115 may mark or otherwise designate the data that remains in the old block 170 as invalid or obsolete and may update a logical-to-physical (L2P) mapping table to associate the logical address (e.g., LBA) for the data with the new, valid block 170 rather than the old, invalid block 170. In some cases, such copying and remapping may be performed instead of erasing and rewriting the entire old block 170 due to latency or wearout considerations, for example. In some cases, one or more copies of an L2P mapping table may be stored within the memory cells of the memory device 130 (e.g., within one or more blocks 170 or planes 165) for use (e.g., reference and updating) by the local controller 135 or memory system controller 115.

In some cases, L2P mapping tables may be maintained and data may be marked as valid or invalid at the page level of granularity, and a page 175 may contain valid data, invalid data, or no data. Invalid data may be data that is outdated due to a more recent or updated version of the data being stored in a different page 175 of the memory device 130. Invalid data may have been previously programmed to the invalid page 175 but may no longer be associated with a valid logical address, such as a logical address referenced by the host system 105. Valid data may be the most recent version of such data being stored on the memory device 130. A page 175 that includes no data may be a page 175 that has never been written to or that has been erased.

In some cases, one or more memory system controllers 115 or one or more local controllers 135 may perform operations (e.g., as part of one or more media management algorithms) for a memory device 130, such as wear leveling, background refresh, garbage collection, scrub, block scans, health monitoring, or others, or any combination thereof. For example, within a memory device 130, a block 170 may have some pages 175 containing valid data and some pages 175 containing invalid data. To avoid waiting for all of the pages 175 in the block 170 to have invalid data in order to erase and reuse the block 170, an algorithm referred to as "garbage collection" may be invoked to allow the block 170 to be erased and released as a free block for subsequent write operations. Garbage collection may refer to a set of media management operations that include, for example, selecting a block 170 that contains valid and invalid data, selecting pages 175 in the block that contain valid data, copying the valid data from the selected pages 175 to new locations (e.g., free pages 175 in another block 170), marking the data in the previously selected pages 175 as invalid, and erasing the selected block 170. As a result, the quantity of blocks 170 that have been erased may be increased such that more blocks 170 are available to store subsequent data (e.g., data subsequently received from the host system 105).

In the memory system 110, reading a set of cells (e.g., memory cells associated with a word line) repeatedly may accumulate disturb (e.g., change the threshold voltages of) on neighboring cells, which may lead to errors in the neighboring cells. To detect and correct for such errors (which may be referred to as read disturb errors), the memory system 110 may perform error rate detection procedures, which may also be referred to as probabilistic read disturb handling (PRDH) scans or suitable terminology. During an error rate detection procedure, the memory system 110 may read a set of cells (e.g., memory cells associated with one or more word lines) and perform error rate detection on the data read from the set of cells to detect errors in the data. The memory system 110 may then determine (e.g., estimate, extrapolate) an error rate for a superset of cells (e.g., a block) that includes the set of cells. For example, the memory system 110 may determine the bit error rate (BER) for the block of cells. If the error rate for the block of cells satisfies (e.g., meets or exceeds) a threshold error rate, the memory system 100 may take remedial action.

The memory system 110 may use a triggering condition to initiate performance of an error rate detection procedure. For example, the memory system 110 perform an error rate detection procedure upon determining that a threshold quantity of read commands has been received for a portion (e.g., a die) of the memory system 110. But the memory system 110 may still be servicing access commands from the host system 105. Performing error rate detection procedures concurrently with servicing access commands from the host system 105 may increase the latency associated with servicing the access commands, which in turn may negatively impact user experience, among other disadvantages.

According to the techniques described herein, the memory system 110 may improve user experience and reduce latency of performing some commands, among other advantages, by delaying performance of at least some error rate detection procedures until the memory system 110 determines (e.g., detects) that access activity (e.g., the issuance of memory access commands) from the host system 105 has lapsed for a threshold duration. A memory access command, which may also be referred to as an access command, may refer to a command that instructs the memory system 110 to access (e.g., read or write) a memory (e.g., a memory device 130) of the memory system 110. A duration in which memory access activity from the host system 105 has lapsed may also be referred to as idle time or background time. During the idle time, the memory system 110 may perform one or more error rate detection procedures that were previously queued during active time, which may refer to a duration in which access activity (e.g., issuance of one or more memory access commands) from the host system 105 occurs. By performing error rate detection procedures during idle time, the memory system 110 may use resources (that would otherwise be used for the error rate detection procedures) for memory access operations requested by the host system 105 during active time, which may improve the performance of the memory system 110.

The system 100 may include any quantity of non-transitory computer readable media that support efficient performance of error rate detection procedures in a memory system. For example, the host system 105 (e.g., one or more host system controllers 106), the memory system 110 (e.g., one or more memory system controllers 115), or a memory device 130 (e.g., one or more local controllers 135) may include or otherwise may access one or more non-transitory computer readable media storing instructions (e.g., firmware, logic, code) for performing the functions ascribed herein to the host system 105, the memory system 110, or a memory device 130. For example, such instructions, if executed by the host system 105 (e.g., by a host system controller 106), by the memory system 110 (e.g., by a memory system controller 115), or by a memory device 130 (e.g., by a local controller 135), may cause the host system 105, the memory system 110, or the memory device 130 to perform associated functions as described herein.

FIG. 2 illustrates an example of a memory system 200 that supports efficient performance of error rate detection procedures in accordance with examples as disclosed herein. The memory system 200 may be an example of a memory system 110 as described with reference to FIG. 1, or aspects thereof. The memory system 200 may be configured to store data received from the host system and to send data to the host system, if requested by the host system using memory access commands (e.g., read commands or write commands). According to the techniques described herein, the memory system 200 may improve performance relative to other techniques by selectively performing at least some perform error rate detection procedures during an idle time detected by the memory system 200.

The memory system 200 may include a controller 205, which may control various operations of the memory system 200. In some examples, the controller 205 may be an example of the memory system controller 115 or a local controller 135. The memory system 200 may also include a memory 210, which may include one or more memory devices such as the memory devices 130 as described with reference to FIG. 1. The memory 210 may be divided into K blocks of memory denoted block 0 through block K−1. A block may include one or more dies, each of which may include one or more planes. For example, block 0 may include die 0 and die 1, and each die may include three planes denoted P0, P1, and P2. Each plan may be associated with a set of N word lines denoted WL0 through WLN−1. The configuration of the memory 210 is for illustrative purposes and other configurations of the memory 210 are contemplated and within the scope of the present disclosure.

The memory system 200 may include one counters for tracking the read commands received for the memory 210. For example, the memory system 200 may include read counters 215, which may include read counters for different portions of the memory system 200. For instance, the read counters 215 may include a read counter for each die in the memory 210. A read counter for a portion of the memory 210 may be incremented for each read command received for that portion and may be reset if the quantity of read commands for the portion satisfies an upper threshold quantity, which may be referred to as the window size. The window size for different portions of the memory 210 may be the same or different.

The memory system 200 may include a queue 220 that is for tracking requests for error rate detection procedures that the memory system 200 is to perform. For example, upon determining to perform an error rate detection procedure (e.g., based on satisfaction of a triggering condition), the memory system 200 may add a request for the error rate detection procedure to the queue 220. Thus, requests for error rate detection procedures may be accumulated in the queue 220. Upon performing an error rate detection procedure associated with a request in the queue 220, the memory system 200 may remove the request from the queue 220. The memory system 200 may perform at least some of the error rate detection procedures associated with the requests in the queue 220 in the background (e.g., during an idle time). However, if too many requests accumulate in the queue 220, the memory system 200 may perform some error rate detection procedures associated with requests in the queue 220 in the foreground (e.g., during an active time) to reduce the quantity of requests in the queue 220 to a more manageable quantity. In some examples, the queue 220 may be part of the local memory 120 as described with reference to FIG. 1, and thus may be limited in size (e.g., capacity).

As noted, the memory system 200 may receive read commands from a host system and increment read counters based on (e.g., in response to) receiving the read commands. To illustrate, an example is considered in which the read counters 215 are dedicated to respective dies of a block (e.g., a first read counter is dedicated to tracking read commands for die 0 of block 0 and a second read counter is dedicated to tracking read commands for die 1 of block 0. In such an example, the memory system 200 may increment the value of the read counter for die 0 for each read command received for die 0. Similarly, the memory system 200 may increment the value of the read counter for die 1 for each read command received for die 1. Upon determining that the quantity of read commands for a die satisfies (e.g., is equal to) an upper threshold quantity (e.g., the window size for that die), the memory system 200 may reset the read counter for that die (e.g., so that value of the reach counter is zero).

The memory system 200 may determine (e.g., track) the quantity of read commands per die so that the memory system 200 can detect triggering conditions for performing error rate detection procedures. For example, an error rate detection procedure may be triggered if the quantity of read commands received for a die satisfies (e.g., is greater than or equal to) a trigger threshold quantity, which may be less than the upper threshold quantity. In some examples, the trigger threshold quantity may be a unique random number that is generated by the memory system 200 or the host system.

Upon detecting that the quantity of read commands received for a die satisfies the trigger threshold quantity, the memory system 200 may add to the queue a request for an error rate detection procedure associated with that die. The request for an error rate detection procedure may indicate the error rate detection procedure as well as a set of cells for performing the error rate detection procedure. The set of cells for an error rate detection procedure may include cells in the block associated with the die and may include cells associated with one or more word lines. In some examples, the set of cells for an error rate detection procedure may include the cells of the word line associated with the read command that triggered the request as well as cells of one or more neighboring word lines.

The memory system 200 may monitor for an idle time during which to perform the error rate detection procedures indicated by the requests in the queue 220. For example, the memory system 200 may monitor the amount of time that elapses between receipt of adjacent (e.g., back-to-back) memory access requests from the host system. If the amount of time elapsed since receipt of a latest memory access request satisfies (e.g., meets or exceeds) a threshold duration, the memory system 200 may determine that access activity from the host system has lapsed and that the memory system 200 is experiencing an idle time. Upon detecting the idle time, the memory system 200 may perform (during the idle time) one or more error rate detection procedures indicated by the requests in the queue 220.

In some examples, performance of an error rate detection procedure during the idle time may coincide (e.g., occur concurrently such as overlapping at least partially in time) with performance of a background operation. A background operation may refer to an operation that is performed by the memory system 200 during an idle time (e.g., a period of time in which there is no host traffic to the memory system 200, where traffic may refer to commands for host-initiated memory access operations or commands for other types of host-initiated operations). Example background operations include wear-leveling operations, garbage collection operations, and the like.

So, the memory system 200 may perform at least some error rate detection procedures during idle time even if the triggering condition for the error rate detection procedures occurs during active time. Although performance of error rate detection procedures during idle time may provide various performance and latency advantages, the memory system 200 may nevertheless perform some error rate detection procedures during active time so that the requests in the queue 220 do not overflow (e.g., exceed the capacity of the queue). For instance, if the memory system 200 detects that the quantity of requests in the queue satisfies a first threshold quantity (e.g., is greater than or equal to 800), the memory system 200 may perform error rate detection procedures associated with the requests until the quantity of requests in the queue satisfies a second threshold quantity (e.g., is less than or equal to 600). In such cases, an error rate detection procedure triggered during a first active time may be delayed until a second active time.

Thus, the memory system 200 may performing at least some perform error rate detection procedures during an idle time detected by the memory system 200, which may improve performance of the memory system 200 relative to other techniques (e.g., those that perform error rate detection procedures exclusively during active time).

Figure 3:
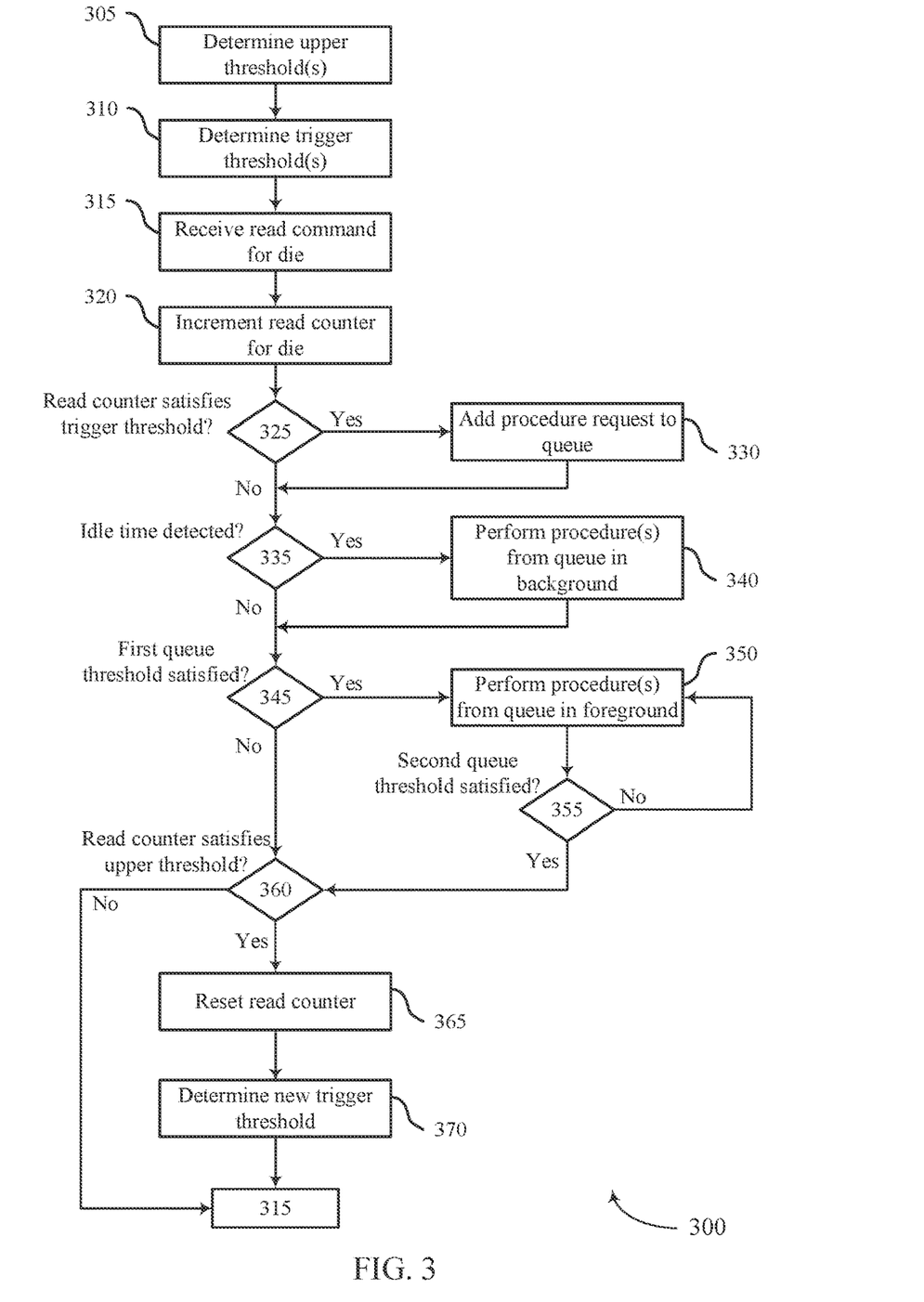
FIG. 3 illustrates an example of a process flow that supports efficient performance of error rate detection procedures in a memory system in accordance with examples as disclosed herein.

FIG. 3 illustrates an example of a process flow 300 that supports efficient performance of error rate detection procedures in a memory system in accordance with examples as disclosed herein. The process flow 300 may be implemented by a memory system 110 or a memory system 200 as described with reference to FIGS. 1 and 2, respectively. By implementing the process flow 300, which facilitates performance of error rate detection procedures during idle time, the memory system may reduce the latency of serving memory access commands (e.g., read commands, write commands) during active time, among other advantages.

Aspects of the process flow 300 may be implemented by a controller, among other components. Additionally or alternatively, aspects of the process flow 300 may be implemented as instructions stored in memory (e.g., firmware stored in a memory coupled with a memory system). For example, the instructions, if executed by a controller (e.g., the controller 205), may cause the controller to perform the operations of the process flow 300.

At 305, one or more upper threshold quantities (window sizes) for one or more read counters for one or more portions of a memory (e.g., dies) may be determined. For example, the memory system may determine an upper threshold quantity for a die x. The memory system may determine an upper threshold quantity autonomously based on (e.g., as a function of) various characteristics of the memory system, based on an indication received from a host system, or both.

At 310, one or more trigger threshold quantities for one or more read counters for one or more portions of the memory may be determined. For example, the memory system may determine a trigger threshold quantity for die x. The trigger threshold quantity (which may be used to trigger an error rate detection procedure) for a die may be less than the upper threshold quantity (which may be used to reset the read counter) for that die. The memory system may determine a trigger threshold quantity autonomously based on (e.g., as a function of) various characteristics of the memory system, based on (e.g., in response to) an indication received from a host system, or both. In some examples, the trigger threshold quantity may be a unique random number that is generated by the memory system or the host system.

At 315, a read command for a die may be received. For example, the memory system may receive a read command for die x. Receipt of the read command may indicate that the memory system is in active time. At 320, the read counter for the die may be modified (e.g., incremented). For example, the memory system may modify (e.g., increment) the read counter for die x based on (e.g., in response to) receipt of the read command for die x. Although described with reference to a die, the techniques described herein may be implemented for any granularity of memory. Although described with reference to incrementation the read counters may alternatively be decremented.

At 325, it may be determined whether the read counter for the die satisfies the trigger threshold quantity for the die. For example, the memory system may determine (e.g., via comparison) whether the value of the read counter for die x is greater than or equal to the trigger threshold quantity for die x.

If, at 325, it is determined that the read counter for the die satisfies (e.g., is greater than or equal to) the trigger threshold quantity for the die, the process flow 300 may proceed to 330. At 330, a request for an error rate detection procedure may be added to a queue of the memory system based on (e.g., in response to) the read counter for the die satisfying the trigger threshold quantity.

If, at 325, it is determined that the read counter for the die does not satisfy (e.g., less than) the trigger threshold quantity for the die, the process flow 300 may proceed to 335. At 335, it may be determined whether the memory system is in idle time. For example, the memory system may determine whether a lapse in access activity from the host system satisfies a threshold duration. A lapse in access activity may refer to the amount of time between receipt of adjacent (e.g., back-to-back) memory access commands from the host system.

If, at 335, it is determined that idle time has been detected, the process flow may proceed to 340. At 340, one or more error rate detection procedures may be performed in the background (e.g., during the idle time). For example, the memory system may perform one or more error rate detection procedures associated with the requests in the queue during the idle time.

If, at 335, it is determined that idle time has not been detected (e.g., a memory access command has been received within a threshold amount of time), the process flow may proceed to 345. At 345, it may be determined whether the queue satisfies a first threshold quantity. For example, the memory system may determine (e.g., via comparison) whether the quantity of requests in the queue is greater than or equal to the first threshold quantity, which may be used to keep the queue length to an appropriate size.

If, at 345, it is determined that the queue satisfies the first threshold quantity, the process flow 300 may proceed to 350. At 350, one or more error rate detection procedures may be performed in the foreground (e.g., during the active time, during a period of resumed access activity). For example, the memory system may perform one or more error rate detection procedures associated with the requests in the queue during the active time so that the quantity of requests in the queue is reduced. At 355, it may be determined whether the queue satisfies a second threshold quantity. For example, the memory system may determine (e.g., via comparison) whether the quantity of requests in the queue is less than or equal to the second threshold quantity, which may be used to keep the queue length to an appropriate size. If, at 355, it is determined that the queue does not satisfy the second threshold quantity, the process flow 300 may proceed to 350 so that the memory system can perform additional error rate detection procedures (and thus reduce the quantity of requests in the queue). If, at 355, it is determined that the queue satisfies the second threshold quantity, the process flow 300 may proceed to 360 so that at least some requests in the queue are available for performance during a subsequent idle time. Thus, the memory system may refrain from performing additional error rate detection procedures during active time based on (e.g., due to) the queue satisfying the second threshold quantity.

If, at 345, it is determined that the queue does not satisfy the first threshold quantity, the process flow 300 may proceed to 360. At 360, it may be determined whether the read counter for the die satisfies the upper threshold quantity. For example, the memory system may determine whether the read counter for die x is greater than or equal to the upper threshold quantity for die x. If, at 360, it is determined that the read counter for the die does not satisfy the upper threshold quantity, the process flow 300 may return to 315.

If, at 360, it is determined that the read counter for the die satisfies the upper threshold quantity, the process flow 300 may proceed to 365. At 365, the read counter for the die may be reset based on (e.g., in response to) the read counter for the die satisfying the upper threshold quantity. At 370, a new (e.g., updated) trigger threshold quantity may be determined, similar to the operation at 310. The process flow 300 may then proceed to 315.

Thus, the memory system may perform error rate detection procedures during idle time, which may improve the performance of the memory system. Alternative examples of the foregoing may be implemented, where some operations are performed in a different order than described, are performed in parallel, or are not performed at all. In some cases, operations may include additional features not mentioned herein, or further operations may be added. Additionally, certain operations may be performed multiple times or certain combinations of operations may repeat or cycle.

Figure 4:
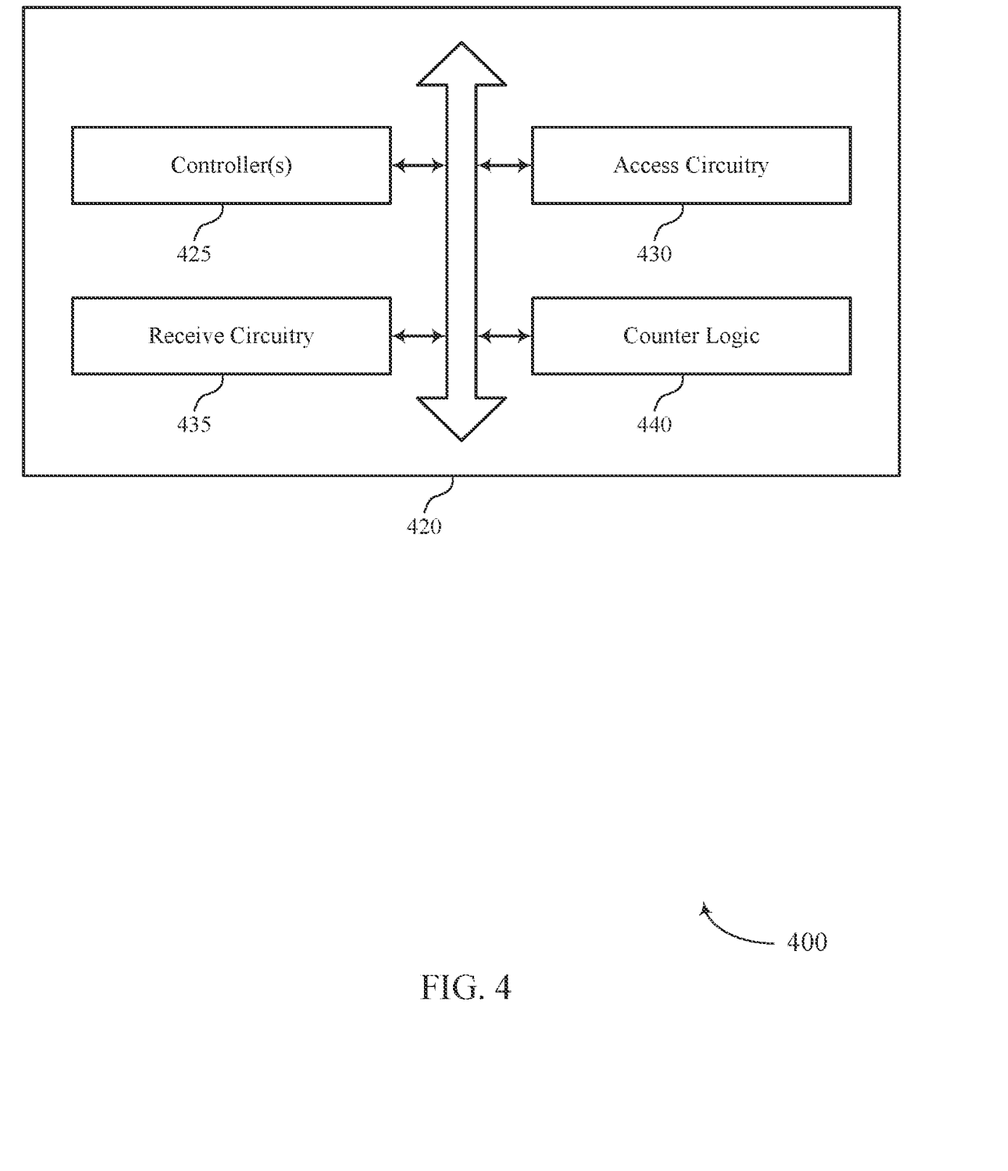
FIG. 4 illustrates a block diagram of a memory system that supports efficient performance of error rate detection procedures in accordance with examples as disclosed herein.

FIG. 4 illustrates a block diagram 400 of a memory system 420 that supports efficient performance of error rate detection procedures in accordance with examples as disclosed herein. The memory system 420 may be an example of aspects of a memory system as described with reference to FIGS. 1 through 3. The memory system 420, or various components thereof, may be an example of means for performing various aspects of efficient performance of error rate detection procedures in a memory system as described herein. For example, the memory system 420 may include a controller 425, an access circuitry 430, a receive circuitry 435, a counter logic 440, or any combination thereof. Each of these components may communicate, directly or indirectly, with one another (e.g., via one or more buses).

The controller 425 may be configured as or otherwise support a means for determining whether a condition for performing an error rate detection procedure has been satisfied, the error rate detection procedure including reading a set of memory cells to determine an error rate for the set of memory cells. In some examples, the controller 425 may be configured as or otherwise support a means for adding a request for the error rate detection procedure to a queue based at least in part on determining that the condition for performing the error rate detection procedure has been satisfied. The access circuitry 430 may be configured as or otherwise support a means for performing the error rate detection procedure indicated by the request in the queue based at least in part on determining that access activity from a host system has lapsed for a threshold duration.

In some examples, to support determining that access activity has lapsed, the controller 425 may be configured as or otherwise support a means for determining that the threshold duration has elapsed since receipt of a memory access command from the host system.

In some examples, the access circuitry 430 may be configured as or otherwise support a means for performing, during a period of resumed of access activity by the host system after the threshold duration, a second error rate detection procedure indicated by a second request in the queue based at least in part on a quantity of requests in the queue being greater than or equal to a threshold.

In some examples, the controller 425 may be configured as or otherwise support a means for refraining, after performing the second error rate detection procedure, from performing a third error rate detection procedure indicated by a third request in the queue based at least in part on the quantity of requests in the queue being less than or equal to a second threshold.

In some examples, the access circuitry 430 may be configured as or otherwise support a means for performing a second error rate detection procedure indicated by a second request in the queue based at least in part on determining that access activity from the host system has lapsed for the threshold duration of time.

In some examples, the condition includes a quantity of read commands received from the host system satisfying a threshold quantity, and the receive circuitry 435 may be configured as or otherwise support a means for receiving a read command from the host system. In some examples, the condition includes a quantity of read commands received from the host system satisfying a threshold quantity, and the counter logic 440 may be configured as or otherwise support a means for incrementing a counter for read commands received from the host system based at least in part on receiving the read command, where the determination that the condition is satisfied is based at least in part on incrementing the counter.

In some examples, the counter logic 440 may be configured as or otherwise support a means for resetting the counter for read commands based at least in part on determining that the quantity of read commands satisfies a second threshold quantity that is greater than the threshold quantity.

In some examples, the counter logic 440 may be configured as or otherwise support a means for updating the threshold quantity based at least in part on resetting the counter for read commands. In some examples, the set of memory cells is in a memory system. In some examples, the threshold quantity includes a number generated by the memory system. In some examples, the set of memory cells includes different memory cells each associated with different word lines or planes in a memory of a memory system.

Figure 5:
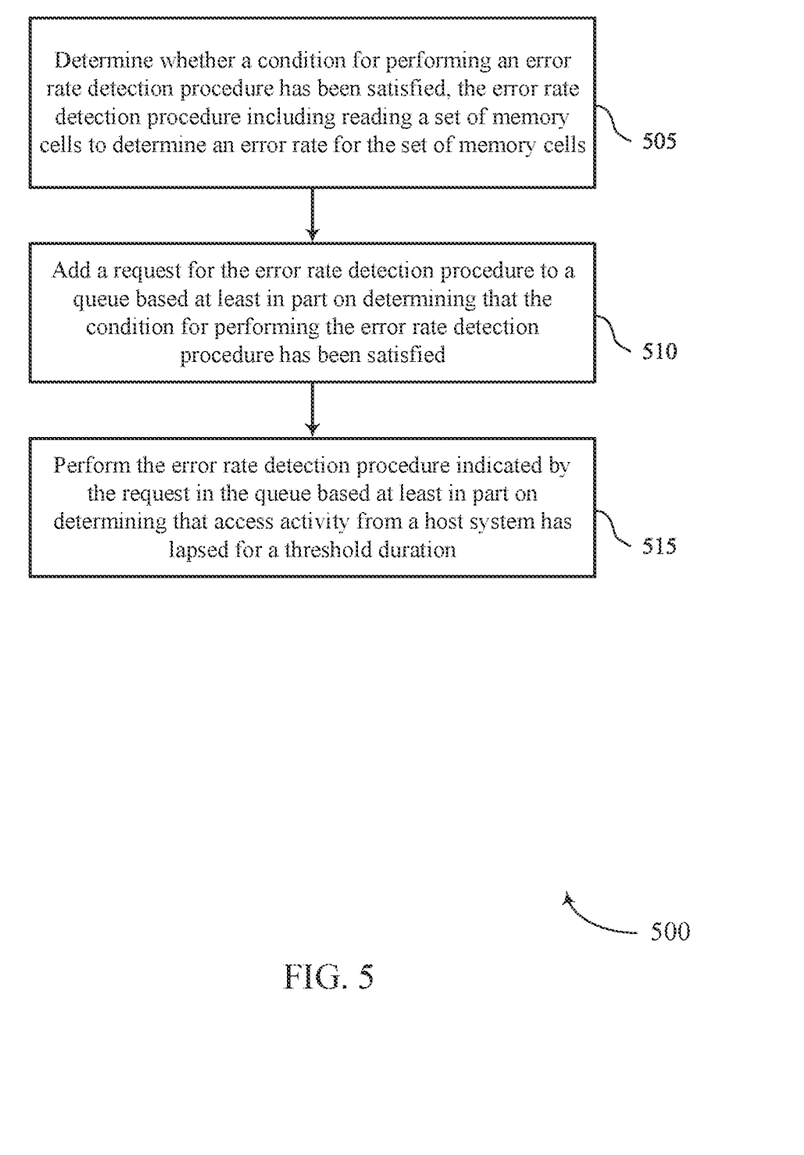
FIG. 5 illustrates a flowchart showing a method or methods that support efficient performance of error rate detection procedures in a memory system in accordance with examples as disclosed herein.

FIG. 5 illustrates a flowchart showing a method 500 that supports efficient performance of error rate detection procedures in a memory system in accordance with examples as disclosed herein. The operations of method 500 may be implemented by a memory system or its components as described herein. For example, the operations of method 500 may be performed by a memory system as described with reference to FIGS. 1 through 4. In some examples, a memory system may execute a set of instructions to control the functional elements of the device to perform the described functions. Additionally, or alternatively, the memory system may perform aspects of the described functions using special-purpose hardware.

At 505, the method may include determining whether a condition for performing an error rate detection procedure has been satisfied, the error rate detection procedure including reading a set of memory cells to determine an error rate for the set of memory cells. The operations of 505 may be performed in accordance with examples as disclosed herein. In some examples, aspects of the operations of 505 may be performed by a controller 425 as described with reference to FIG. 4.

At 510, the method may include adding a request for the error rate detection procedure to a queue based at least in part on determining that the condition for performing the error rate detection procedure has been satisfied. The operations of 510 may be performed in accordance with examples as disclosed herein. In some examples, aspects of the operations of 510 may be performed by a controller 425 as described with reference to FIG. 4.

At 515, the method may include performing the error rate detection procedure indicated by the request in the queue based at least in part on determining that access activity from a host system has lapsed for a threshold duration. The operations of 515 may be performed in accordance with examples as disclosed herein. In some examples, aspects of the operations of 515 may be performed by an access circuitry 430 as described with reference to FIG. 4.

In some examples, an apparatus as described herein may perform a method or methods, such as the method 500. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for determining whether a condition for performing an error rate detection procedure has been satisfied, the error rate detection procedure including reading a set of memory cells to determine an error rate for the set of memory cells; adding a request for the error rate detection procedure to a queue based at least in part on determining that the condition for performing the error rate detection procedure has been satisfied; and performing the error rate detection procedure indicated by the request in the queue based at least in part on determining that access activity from a host system has lapsed for a threshold duration.

Aspect 2: The method, apparatus, or non-transitory computer-readable medium of aspect 1, where determining that access activity has lapsed includes operations, features, circuitry, logic, means, or instructions, or any combination thereof for determining that the threshold duration has elapsed since receipt of a memory access command from the host system.

Aspect 3: The method, apparatus, or non-transitory computer-readable medium of any of aspects 1 through 2, further including operations, features, circuitry, logic, means, or instructions, or any combination thereof for performing, during a period of resumed of access activity by the host system after the threshold duration, a second error rate detection procedure indicated by a second request in the queue based at least in part on a quantity of requests in the queue being greater than or equal to a threshold.

Aspect 4: The method, apparatus, or non-transitory computer-readable medium of aspect 3, further including operations, features, circuitry, logic, means, or instructions, or any combination thereof for refraining, after performing the second error rate detection procedure, from performing a third error rate detection procedure indicated by a third request in the queue based at least in part on the quantity of requests in the queue being less than or equal to a second threshold.

Aspect 5: The method, apparatus, or non-transitory computer-readable medium of any of aspects 1 through 4, further including operations, features, circuitry, logic, means, or instructions, or any combination thereof for performing a second error rate detection procedure indicated by a second request in the queue based at least in part on determining that access activity from the host system has lapsed for the threshold duration of time.

Aspect 6: The method, apparatus, or non-transitory computer-readable medium of any of aspects 1 through 5, where the condition includes a quantity of read commands received from the host system satisfying a threshold quantity and the method, apparatuses, and non-transitory computer-readable medium further includes operations, features, circuitry, logic, means, or instructions, or any combination thereof for receiving a read command from the host system and incrementing a counter for read commands received from the host system based at least in part on receiving the read command, where the determination that the condition is satisfied is based at least in part on incrementing the counter.

Aspect 7: The method, apparatus, or non-transitory computer-readable medium of aspect 6, further including operations, features, circuitry, logic, means, or instructions, or any combination thereof for resetting the counter for read commands based at least in part on determining that the quantity of read commands satisfies a second threshold quantity that is greater than the threshold quantity.

Aspect 8: The method, apparatus, or non-transitory computer-readable medium of aspect 7, further including operations, features, circuitry, logic, means, or instructions, or any combination thereof for updating the threshold quantity based at least in part on resetting the counter for read commands.

Aspect 9: The method, apparatus, or non-transitory computer-readable medium of any of aspects 6 through 8, where the set of memory cells is in a memory system and the threshold quantity includes a number generated by the memory system.

Aspect 10: The method, apparatus, or non-transitory computer-readable medium of any of aspects 1 through 9, where the set of memory cells includes different memory cells each associated with different word lines or planes in a memory of a memory system.

It should be noted that the described techniques include possible implementations, and that the operations and the steps may be rearranged or otherwise modified and that other implementations are possible. Further, portions from two or more of the methods may be combined.

An apparatus is described. The following provides an overview of aspects of the apparatus as described herein:

Aspect 11: An apparatus, including: a memory device; and a controller coupled with the memory device and configured to cause the apparatus to: determine whether a condition for performing an error rate detection procedure has been satisfied, the error rate detection procedure including reading a set of memory cells to determine an error rate for the set of memory cells; add a request for the error rate detection procedure to a queue based at least in part on determining that the condition for performing the error rate detection procedure has been satisfied; and perform the error rate detection procedure indicated by the request in the queue based at least in part on determining that access activity from a host system has lapsed for a threshold duration.

Aspect 12: The apparatus of aspect 11, where the controller is configured to cause the apparatus to determine that access activity has lapsed by being configured to cause the apparatus to: determine that the threshold duration has elapsed since receipt of a memory access command from the host system.

Aspect 13: The apparatus of any of aspects 11 through 12, where the controller is further configured to cause the apparatus to: perform, during a period of resumed of access activity by the host system after the threshold duration, a second error rate detection procedure indicated by a second request in the queue based at least in part on a quantity of requests in the queue being greater than or equal to a threshold.

Aspect 14: The apparatus of aspect 13, where the controller is further configured to cause the apparatus to: refrain, after performing the second error rate detection procedure, from performing a third error rate detection procedure indicated by a third request in the queue based at least in part on the quantity of requests in the queue being less than or equal to a second threshold.

Aspect 15: The apparatus of any of aspects 11 through 14, where the controller is further configured to cause the apparatus to: perform a second error rate detection procedure indicated by a second request in the queue based at least in part on determining that access activity from the host system has lapsed for the threshold duration of time.

Aspect 16: The apparatus of any of aspects 11 through 15, where the condition includes a quantity of read commands received from the host system satisfying a threshold quantity, and where the controller is further configured to cause the apparatus to: receive a read command from the host system; and increment a counter for read commands received from the host system based at least in part on receiving the read command, where the determination that the condition is satisfied is based at least in part on incrementing the counter.

Aspect 17: The apparatus of aspect 16, where the controller is further configured to cause the apparatus to: reset the counter for read commands based at least in part on determining that the quantity of read commands satisfies a second threshold quantity that is greater than the threshold quantity.

Aspect 18: The apparatus of aspect 17, where the controller is further configured to cause the apparatus to: update the threshold quantity based at least in part on resetting the counter for read commands.

Aspect 19: The apparatus of any of aspects 16 through 18, where the set of memory cells is in a memory system, and the threshold quantity includes a number generated by the memory system.

Aspect 20: The apparatus of any of aspects 11 through 19, where the set of memory cells includes different memory cells each associated with different word lines or planes in a memory of a memory system.

Information and signals described herein may be represented using any of a variety of different technologies and techniques. For example, data, instructions, commands, information, signals, bits, or symbols of signaling that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" (e.g., "electrically coupling") may refer to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

As used herein, the term "substantially" means that the modified characteristic (e.g., a verb or adjective modified by the term substantially) need not be absolute but is close enough to achieve the advantages of the characteristic.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed and second condition or action may occur directly as a result of the previous condition or action occurring independent of whether other conditions or actions occur. In some examples, a first condition or action may be performed and second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally, or alternatively (e.g., in an alternative example), be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to provide an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, the described functions can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of these are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus, comprising:
   one or more memory devices; and
   a controller coupled with the one or more memory devices and configured to cause the apparatus to:
   determine whether a condition for performing an error rate detection procedure has been satisfied, the error rate detection procedure comprising reading a set of memory cells to determine an error rate for the set of memory cells;
   add a request for the error rate detection procedure to a queue based at least in part on determining that the condition for performing the error rate detection procedure has been satisfied;
   refrain from performing the error rate detection procedure during a period of access activity by a host system based at least in part on a quantity of error rate detection procedure requests in the queue being less than or equal to a threshold; and
   perform the error rate detection procedure indicated by the request in the queue based at least in part on determining that access activity from the host system has lapsed for a threshold duration.

2. The apparatus of claim 1, wherein the controller is configured to cause the apparatus to determine that access activity has lapsed by being configured to cause the apparatus to:
   determine that the threshold duration has elapsed since receipt of a memory access command from the host system.

3. The apparatus of claim 1, wherein the controller is further configured to cause the apparatus to:
   perform, during a period of resumed of access activity by the host system after the threshold duration, a second error rate detection procedure indicated by a second request in the queue based at least in part on the quantity of requests in the queue being greater than or equal to the threshold.

4. The apparatus of claim 3, wherein the controller is further configured to cause the apparatus to:
   refrain, after performing the second error rate detection procedure, from performing a third error rate detection procedure indicated by a third request in the queue based at least in part on the quantity of requests in the queue being less than or equal to a second threshold.

5. The apparatus of claim 1, wherein the controller is further configured to cause the apparatus to:
   perform a second error rate detection procedure indicated by a second request in the queue based at least in part on determining that access activity from the host system has lapsed for the threshold duration of time.

6. The apparatus of claim 1, wherein the condition comprises a quantity of read commands received from the host system satisfying a threshold quantity, and wherein the controller is further configured to cause the apparatus to:
   receive a read command from the host system; and
   increment a counter for read commands received from the host system based at least in part on receiving the read command, wherein the determination that the condition is satisfied is based at least in part on incrementing the counter.

7. The apparatus of claim 6, wherein the controller is further configured to cause the apparatus to:
   reset the counter for read commands based at least in part on determining that the quantity of read commands satisfies a second threshold quantity that is greater than the threshold quantity.

8. The apparatus of claim 7, wherein the controller is further configured to cause the apparatus to:
   update the threshold quantity based at least in part on resetting the counter for read commands.

9. The apparatus of claim 6, wherein the set of memory cells is in a memory system, and wherein the threshold quantity comprises a number generated by the memory system.

10. The apparatus of claim 1, wherein the set of memory cells includes different memory cells each associated with different word lines or planes in a memory of a memory system.

11. A method, comprising:
    determining whether a condition for performing an error rate detection procedure has been satisfied, the error rate detection procedure comprising reading a set of memory cells to determine an error rate for the set of memory cells;
    adding a request for the error rate detection procedure to a queue based at least in part on determining that the condition for performing the error rate detection procedure has been satisfied;
    refraining from performing the error rate detection procedure during a period of access activity by a host system based at least in part on a quantity of error rate detection procedure requests in the queue being less than or equal to a threshold; and performing the error rate detection procedure indicated by the request in the queue based at least in part on determining that access activity from the host system has lapsed for a threshold duration.

12. The method of claim 11, wherein determining that access activity has lapsed comprises:
   determining that the threshold duration has elapsed since receipt of a memory access command from the host system.

13. The method of claim 11, further comprising:
   performing, during a period of resumed of access activity by the host system after the threshold duration, a second error rate detection procedure indicated by a second request in the queue based at least in part on the quantity of requests in the queue being greater than or equal to the threshold.

14. The method of claim 13, further comprising:
   refraining, after performing the second error rate detection procedure, from performing a third error rate detection procedure indicated by a third request in the queue based at least in part on the quantity of requests in the queue being less than or equal to a second threshold.

15. The method of claim 11, further comprising:
   performing a second error rate detection procedure indicated by a second request in the queue based at least in part on determining that access activity from the host system has lapsed for the threshold duration of time.

16. The method of claim 11, wherein the condition comprises a quantity of read commands received from the host system satisfying a threshold quantity, the method further comprising:
   receiving a read command from the host system; and
   incrementing a counter for read commands received from the host system based at least in part on receiving the read command, wherein the determination that the condition is satisfied is based at least in part on incrementing the counter.

17. The method of claim 16, further comprising:
   resetting the counter for read commands based at least in part on determining that the quantity of read commands satisfies a second threshold quantity that is greater than the threshold quantity.

18. The method of claim 17, further comprising:
   updating the threshold quantity based at least in part on resetting the counter for read commands.

19. The method of claim 16, wherein the set of memory cells is in a memory system, and wherein the threshold quantity comprises a number generated by the memory system.

20. A non-transitory computer-readable medium storing code comprising instructions which, when executed by a processor of a memory system, cause the memory system to:
   determine whether a condition for performing an error rate detection procedure has been satisfied, the error rate detection procedure comprising reading a set of memory cells to determine an error rate for the set of memory cells;
   add a request for the error rate detection procedure to a queue based at least in part on determining that the condition for performing the error rate detection procedure has been satisfied;
   refrain from performing the error rate detection procedure during a period of access activity by a host system based at least in part on a quantity of error rate detection procedure requests in the queue being less than or equal to a threshold; and
   perform the error rate detection procedure indicated by the request in the queue based at least in part on determining that access activity from the host system has lapsed for a threshold duration.

* * * * *